United States Patent [19]

Koshio et al.

[11] 4,455,556
[45] Jun. 19, 1984

[54] DISTANCE MEASURING EQUIPMENT

[75] Inventors: Tatsukichi Koshio; Osamu Okamoto, both of Tokyo, Japan

[73] Assignee: Nippon Electric Co., Ltd., Tokyo, Japan

[21] Appl. No.: 262,860

[22] Filed: May 12, 1981

[30] Foreign Application Priority Data

May 19, 1980 [JP] Japan .................. 55/66113
Sep. 9, 1980 [JP] Japan .................. 55/124874
Mar. 3, 1981 [JP] Japan .................. 56/30285

[51] Int. Cl.³ .................. G01S 13/76; G01S 7/28
[52] U.S. Cl. .................. 343/7.3; 343/17.1 R
[58] Field of Search .................. 343/7.3, 17.1 R

[56] References Cited

U.S. PATENT DOCUMENTS

| 3,458,817 | 7/1969 | Cooper et al. | 343/17.1 R X |
| 3,716,857 | 2/1973 | LeGrand | 343/17.1 R X |
| 3,736,589 | 5/1973 | Rambo | 343/17.1 R |
| 3,772,699 | 11/1973 | Romrell | 343/17.1 R X |
| 3,890,618 | 6/1975 | Speiser | 343/17.1 R |
| 3,934,251 | 1/1976 | Spratt | 343/7.3 X |
| 4,123,755 | 10/1978 | Fishbein et al. | 343/17.1 R |
| 4,320,399 | 3/1982 | Buck et al. | 43/17.1 R |

Primary Examiner—T. H. Tubbesing
Attorney, Agent, or Firm—Sughrue, Mion, Zinn, Macpeak, and Seas

[57] ABSTRACT

In a distance measuring equipment for measuring the distance between an interrogator and a transponder with high precision by detecting the time from transmission of an interrogation pulse from the interrogator to reception of a reply pulse transmitted from the transponder on the basis of timing positions of said respective pulses; as leading edges of the interrogation pulse and reply pulse, a waveform represented by the formula of:

$$E\left[1 - \frac{1+\sqrt{1-4F}}{2\sqrt{1-4F}} E_{xp}\left(-\frac{1-\sqrt{1-4F}}{2F} T\right) + \frac{1-\sqrt{1-4F}}{2\sqrt{1-4F}} E_{xp}\left(-\frac{1+\sqrt{1-4F}}{2F} T\right)\right]$$

where E and F represent finite positive values and T represents time, is used, or else as a leading edge of the interrogation pulse, a waveform which can be approximated by the above formula is used, while as a leading edge of the reply pulse, a waveform obtained by passing a waveform approximately expressed by the formula of:

$$\frac{E}{\sqrt{1-4F}}\left[E_{xp}\left(1 - \frac{1-\sqrt{1-4F}}{2F} T\right) - E_{xp}\left(-\frac{1+\sqrt{1-4F}}{2F} T\right)\right]$$

through a low-pass filter having a predetermined cut-off frequency, is used.

13 Claims, 10 Drawing Figures

DISTANCE MEASURING EQUIPMENT

BACKGROUND OF THE INVENTION

The present invention relates to distance measuring equipment (DME) capable of accurate distance measuring with less influence of multipath signals and with less spectrum spread.

In general, as a navigational guidance system for aircraft, DME (Distance Measuring Equipment) for measuring the distance from ground equipment to an aircraft has been widely employed to obtain position information of the aircraft. In the DME, an electromagnetic wave modulated by a pulse waveform is transmitted from an (interrogator for instance, an aircraft, and a reply pulse is transmitted from a transponder for instance, a ground station after the reception of the electromagnetic pulse. An aircraft determines the distance between both stations by measuring the time period from the transmission of the pulse to the reception of the reply pulse. With regard to DME for MLS, a detailed description is provided in "Microwave Landing System Phase III" published June 1978 by the FEDERAL AVIATION ADMINISTRATION and in the article by R. J. Kelly and E. F. C. LaBerge entitled "Guidance Accuracy Considerations for the Microwave Landing System Precision DME", NAVIGATION: Journal of the Institute of Navigation, Vol. 27, No. 1, Spring 1980.

For the above-mentioned modulating pulse, in view of the international nature of the DME, the following severe international standard is provided by the ICAO (International Civil Aviation Organization) ANNEX 10 and ARINC (Aeronautical Radio INC.):

(1) The pulse width should be 3.5±0.5 μs.
(2) The fall time should be 3 μs or less.
(3) Preferably the rise time should be 1.6 μs.
(4) With respect to a signal transmitted from a transponder (a ground equipment), the absolute value of the spectrum power within a 500 KHz band at a frequency point offset by 800 KHz from the carrier frequency should be 200 mW or less, and that at a frequency point offset by 2 MHz the spectrum power should be 2 mW or less.
(5) With respect to a signal transmitted from an interrogator (an aircraft equipment), the relative value of the spectrum power within a 500 KHz band at a frequency point offset by 800 KHz from the carrier frequency (relative to that at a center frequency) should be −23 dB or less, and that at a frequency point offset by 2 MHz should be −38 dB or less.

A waveform used currently and commonly as a pulse waveform conformable to the above standard, is the Gaussian waveform. Owing to the fact that the Gaussian waveform has a nature that its power spectrum also takes a Gaussian form (that is, a function obtained by Fourier-transforming the time domain Gaussian waveform also has a Gaussian form in the frequency domain), the Gaussian waveform has an excellent advantage that its spectrum can be concentrated within a relatively narrow band as compared to other pulse waveforms. However, if it is intended to determine accurate timing (pulse position) by making use of this waveform, problems as described hereunder would arise.

In general, the above-mentioned determination of a pulse position is effected by selecting a a threshold voltage corresponding to 50% of the peak voltage and measuring the time point (timing) when a rising waveform of a received signal crosses this threshold voltage.

However, since the slope of the Gaussian waveform in the proximity of the 50% point is relatively gradual, temperature induced variation of circuit element properties would cause a variation of the threshold voltage, and as a result, a distance error would be produced because the above-referred timing (pulse position) greatly changes. Especially in DME, where the distance to be measured varies over 0—200 NM (nautical miles), and hence under the reception level is subjected to a dynamic level change of 60 dB or more, detection of the above-mentioned timing becomes more difficult and it is liable to be influenced by noise.

Moreover, in the case of the Gaussian waveform, since the above-mentioned timing detection point having a 50% peak value exists at a relatively delayed point of about 1.25 μs after the rise point of the waveform, it is liable to be influenced by reflected waves in the electromagnetic wave propagation path. More particularly, all the reflected waves having a delay relative to the direct wave of 1.25 μs (in terms of distance, 375 m) or less will overlap the aforementioned timing detection point and will influence the voltage at the point, and hence, in association with the aforementioned fact that the slope of the Gaussian waveform at the timing detection point is gradual, it produces a relatively large error in distance measurement.

Although the distance measurement system known in the prior art can meet the required performance for the purpose of being used for aviation route measurement despite the aforementioned shortcomings, it cannot meet the accuracy required for the all-weather landing guidance system in the future in which a high measurement accuracy is required.

In order to mitigate such short comings, recently proposals have been made as will be described in the following.

One of the proposals is the Delay and Compare (hereinafter abbreviated as DAC) which was proposed as one method for preventing deviation of a timing detection point caused by variation of the threshold voltage. According to this method, the received and detected wave is divided into two, and after one has been attenuated by a predetermined amount through an attenuator (multiplied by a factor of A: A<1) and the other has been delayed by a predetermined amount (D sec.) through a delay circuit, when a difference between the attenuated waveform and the delayed waveform (the latter minus the former) is derived through a comparator, the output of the comparator crosses over zero-level steeply at the crossing point between the attenuated waveform and the delayed waveform. If this time point whent the difference waveform crosses over the zero-level is employed as a timing point, then this timing point is determined only by the shape of the pulse and is independent of the amplitude of the pulse. Accordingly, by designating the most appropriate (the steepest) detection point on the used waveform through appropriate selection of the values of the abovementioned parameters A and D depending upon that waveform, the error due to variations of the threshold voltage as described above can be vastly improved.

However, even with the DAC as explained above, the influences of the input noise as well as the reflected waves in the wave transmission path as described above would appear as variations of the input waveform itself of the DAC, and hence these influences could not be eliminated.

What was proposed under the above-mentioned circumstance was the method in which the pulse waveform was improved into a waveform that is more appropriate for distance measurement than the above-described Gaussian waveform.

Among the waveforms proposed as a waveform meeting the above-described international standard and moreover being more appropriate for distance measurement than the Gaussin waveform, is known a "cos-cos$^2$" waveform. This means a pulse waveform in which a cosine function is used as a waveform for a rising portion (cos ($-\pi/2$) to cos (0) is used) and a cosine square function is used as a waveform for a falling portion (cos$^2$ (0) to cos$^2$ ($\pi/2$) is used). By appropriately selecting the period of the cosine waveform of the rising portion and the period of the cosine square waveform of the falling portion, a waveform conformable to the above-described international standard is obtained. Since this waveform is relatively linear in the proximity of its rise point, by selecting the timing detection point of the waveform derived by the above-described DAC in the proximity of its rise point, this pulse waveform can be used as a high precision distance measurement pulse which has little error due to the influence of reflected waves in the wave propagation path.

However, since this waveform has a discontinuity at the initial rise point (the first order derivative of the waveform jumps from 0 to a finite value at the rise point of the waveform), attenuation of the spectrum at a point far from the carrier frequency is not large, and therefore, the waveform has a shortcoming that the maximum power which can be transmitted is limited in order to make the absolute value of the spectrum power at the 2 MHz point conform to the standard value as per Item (4) of the above-referred international standard conform value.

In this connection, another proposal of employing a "cos$^2$–cos$^2$" waveform was also made. In this proposed method, the rising portion of the "cos–cos$^2$" waveform is replaced with a cosine square function (cos$^2$ ($-\pi/2$) to cos$^2$ (0) is used). In this case also, similarly to the aforementioned "cos–cos$^2$" waveform, by appropriately selecting the period of the cosine square function of the rising portion and the period of the cosine square function of the falling portion, a pulse waveform conformable to the above-mentioned international standard is obtained. In the case of this waveform, although attenuation of a spectrum at a frequency far from the carrier frequency becomes large because the above-described discontinuity at the rise point does not exist, on the other hand since the steepest point on the rising slope (a point of inflection on the rising waveform) must be the 50% point to be selected as a timing detection point for DAC, the time from the initial rise point to that detection point becomes long, and so, this waveform has the shortcoming that it is liable to be very much influenced by the reflected waves in the wave transmission path as described previously.

On the other hand, a spectrum characteristic required for the waveform transmitted from the transponder (ground equipment) is, as provided in Item (4) of the above-described international standard, that the absolute values of spectrum power within 500 kHz bands at the points offset by 800 KHz and 2 MHz, respectively, from the carrier frequency should not exceed 200 mW and 2 mW, respectively. Consequently, the maximum effective radiation power (the maximum ERP) allowed to be transmitted by employing a given waveform would be determined by the degree of attenuation of this waveform at the 800 KHz and 2 MHz offset points, respectively. However, the ratio of the spectrum powers at the 800 KHz and 2 MHz offset points required for the transponder (ground equipment) is 20 dB(=10 log 200/2) as described above, and this is more severe by 5 dB at the 2 MHz offset point than the value required for an interrogator (an aircraft equipment) of 15 dB(=38−23). This is due to the fact that in contrast to the interrogator, which is equipped located on an aircraft and is largely restricted in size and weight, the transponder is located on the ground is not subjected to such restrictions, and hence it is intended to mitigate the influence of adjacent channels as much as possible in the transponder. Accordingly, if a waveform well matched with an interrogator is used, then the attenuation of the spectrum at the 2 MHz offset point is not sufficient for a transponder, and consequently, the allowable maximum ERP would be degraded by about 5 dB (about 30% in terms of power).

SUMMARY OF THE INVENTION

It is therefore one object of the present invention to provide distance measuring equipment which enables high precision measurement that is less influenced by reflected waves (multi-path) in the wave propagation path.

Another object of the present invention is to provide distance measuring equipment which has a low spectrum spread caused by the employed pulse, and therefore has less influence on adjacent channels.

Still another object of the present invention is to provide distance measuring equipment which can also meet a more severe condition relating to spectrum spread that is required for a transponder.

Yet another object of the present invention is to provide distance measuring equipment which enables high precision measurement that is optimum both long-distance measurement and short-distance measurement.

A still further object of the present invention is to provide a pulse waveform adapted to be used in high precision distance measuring equipment, whose steepest amplitude variation point (inflection point) can be varied to any arbitrary point having an amplitude equal to 50% or less of the peak amplitude value, and whose first order derivative at the rising point is zero.

According to one feature of the present invention, there is provided distance measuring equipment for measuring the distance between an interrogator and a transponder with high precision by measuring the time from transmission of an interrogation pulse from the interrogator up to reception of a reply pulse transmitted from the transponder on the basis of timing positions of said respective pulses, in which the leading edges of the interrogation pulse and reply pulse can be approximated by the formula:

$$E\left[1 - \frac{1 + \sqrt{1-4F}}{2\sqrt{1-4F}} E_{xp}\left(-\frac{1-\sqrt{1-4F}}{2F} T\right) + \right.$$

$$\left. \frac{1-\sqrt{1-4F}}{2\sqrt{1-4F}} E_{xp}\left(-\frac{1+\sqrt{1-4F}}{2F}T\right)\right]$$

where E and F represent finite positive values and T represents time. Alternatively, only the leading edge of the interrogation pulse can be approximated by the above formula and the leading edge of the reply pulse is obtained by passing a waveform which can be approximated by the formula:

$$\frac{E}{\sqrt{1-4F}} E_{xp}\left(-\frac{1-\sqrt{1-4F}}{2F}T\right) -$$

$$E_{xp}\left(-\frac{1+\sqrt{1-4F}}{2F}T\right)$$

through a low-pass filter having a predetermined cut-off frequency. As a result the distance measuring system is less influenced by multi-path and has a lower spectrum spread.

Other features and objects of the present invention will become more apparent by reference to the following description of preferred embodiments thereof taken in conjunction with the accompanying drawings.

DETAILED DESCRIPTION OF PREFERRED EMBODIMENTS

Figure 1:
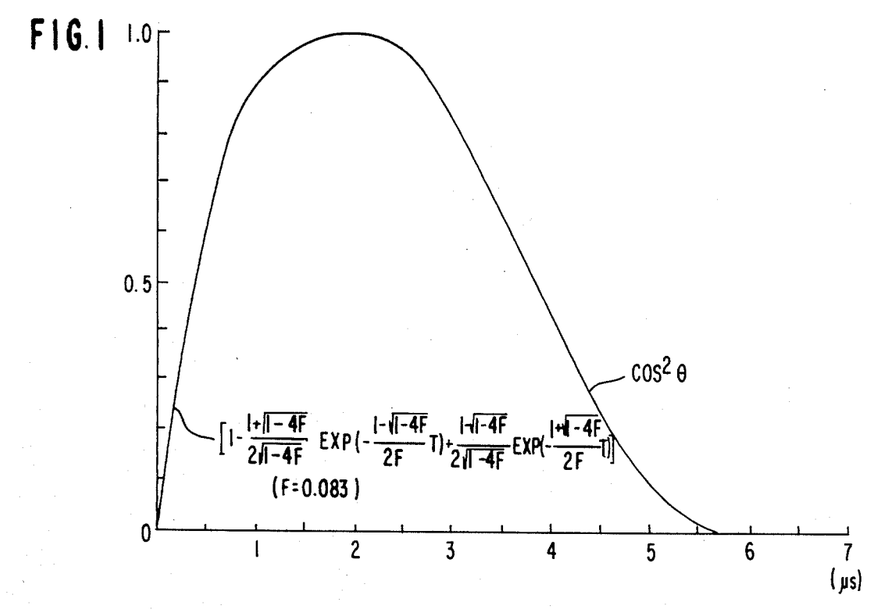
FIG. 1 is a waveform diagram showing a representative pulse waveform to be used in a high precision distance measuring equipment according to the present invention.

A pulse waveform proposed according to the present invention is illustrated in FIG. 1. The rising portion (leading edge) of the pulse waveform is represented by the following formula:

$$V(T) = \qquad (1)$$

$$E\left\{1 - \frac{1+\sqrt{1-4F}}{2\sqrt{1-4F}} E_{xp}\left(-\frac{1-\sqrt{1-4F}}{2F}T\right) + \right.$$

$$\left. \frac{1-\sqrt{1-4F}}{2\sqrt{1-4F}} E_{xp}\left(-\frac{1+\sqrt{1-4F}}{2F}T\right)\right\}$$

where T represents time, E represents a constant and F represents a parameter to be selected so as to obtain a desired position of an inflection point of the waveform. It is to be noted that in the waveform shown in FIG. 1, the parameter F is selected at the value of F=0.083 in order to set an inflection point at a point having an amplitude equal to 15% of the peak amplitude value to reduce the multipath effect. The pulse represented by Formula-(1) is called here "DATE (Damped Transient Edge-Gaussian) pulse". This DATE pulse has the following excellent characteristics.

First, the DATE pulse can be made to approximate a linearly rising waveform very closely. More particularly, for example, if the parameter F is chosen close to 0, then the waveform approximates a waveform given by the formula:

$$V_R(T) = E[1 - \mathrm{Exp}\,(-T)] \qquad (2)$$

The neighborhood of the rise point of this waveform is linear, and hence, this waveform preserves the excellent nature as a high precision measurement pulse of the above-described "cos–cos$^2$" waveform.

Secondly, this waveform is essentially soft in nature at its rise point. That is, the first order derivative of this DATE pulse at its rise point fulfills the following condition for any arbitrary value of F>0:

$$(dV_R(T)/d_t)_{T=0}=0$$

Accordingly, the first derivative at the rise point is continuous, and there exists no discontinuity as seen in the above-described "cos–cos$^2$" waveform. This brings about a favorable effect for supressing spectrum spread.

Thirdly, with respect to this DATE pulse waveform, a point having the steepest rising slope (an inflection point in the rising waveform) can be freely selected at any arbitrary point having an amplitude less than 50% of the peak value. More particularly, as the value of the aforementioned parameter F is brought close to 0, the inflection point of the waveform approaches a zero-level, and as the value of the parameter F is made large, the inflection point approaches 50% of the peak value. When the value of the aforementioned parameter F is brought close to 0, the waveform is approximated by the Formula-(2), and this Formula-(2) can be considered to have the inflection point, in the 0% extreme case, at the point.

Figure 2:
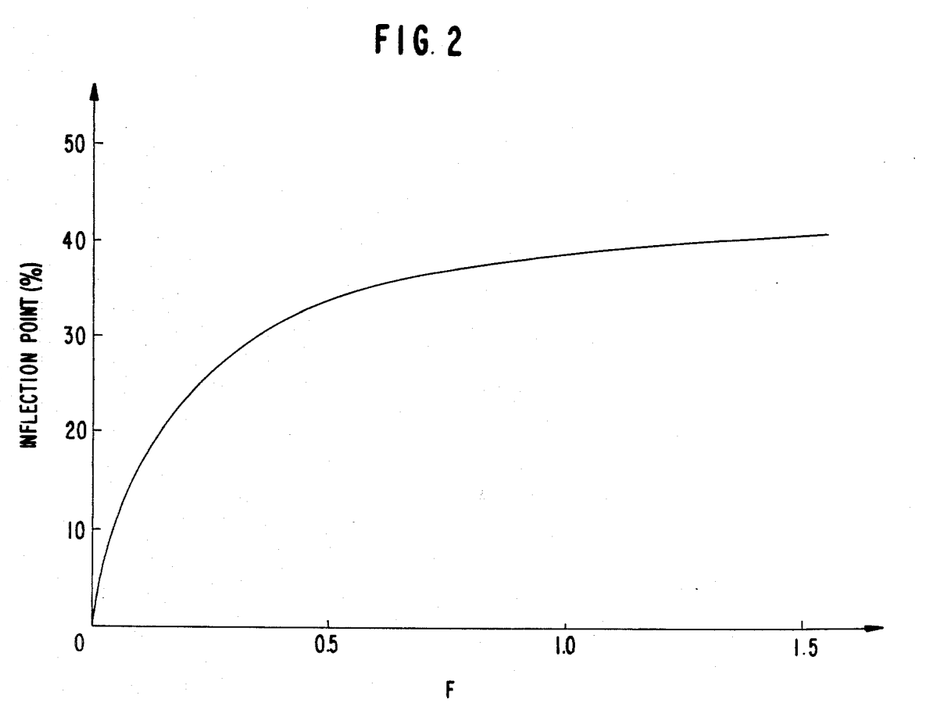
FIG. 2 is a diagram showing a relation between an inflection point of a pulse waveform represented by a general formula proposed according to the present invention and a parameter F contained in the formula.

It is to be noted that if the inflection point in the case of F=¼ (which is the boundary where the waveform given by Formula-(1) changes from an aperiodic transient waveform to a damped oscillation transient waveform) is calculated for reference purpose, it is the point having a magnitude of about 26% of the peak value. In other words, in the case where the inflection point is selected to have a magnitude smaller than 26% of the peak value, the DATE pulse waveform has a rising portion represented by an aperiodic transient waveform, whereas in the case where the inflection point is selected to have a magnitude larger than 26% of the peak value ($F > \frac{1}{4}$), the DATE pulse waveform has a rising portion represented by a damped oscillation transient waveform. The relation between the inflection point and the value of the parameter F is calculated from Formula-(1), and the results are illustrated in FIG. 2.

As described above, in the case of detecting a timing of a received waveform by means of the DAC circuit, it is most desirable to select the detection point at the steepest position in the rising portion of the waveform (at the inflection point of the rising waveform), and furthermore, taking into consideration the above-mentioned influence of reflections during wave propagation, preferably this timing detection point should be as close as possible to the rise point.

In contrast to the fact that in the above-described "$\cos^2-\cos^2$" waveform this inflection point is fixed at the point having a magnitude equal to 50% of the peak value, in the DATE pulse waveform it is possible to preset the inflection point at a point having any arbitrary magnitude less than 50% of the peak value. Therefore, if the inflection point of the waveform is preset in the proximity of the rise point and the timing detection point according to the above-described DAC circuit is selected close to this inflection point, then it becomes possible to greatly reduce the above-mentioned influence of reflected waves in the wave propagation path. It is to be noted that in place of employing the above-described DAC circuit, even if the input wave is divided into two, one being applied directly to one input of a comparator, and the other is applied to the other input of the same comparator after it has been passed through a delay circuit and then through an amplifier, a similar effect can be obtained. In addition, taking into consideration the fact that in the DAC circuit the crossing-point between two waveforms will be varied by noise, it will be obvious that the error will be reduced if the most nearly linear portions of the respective waveforms are selected to cross with each other so that the error produced upon occurrence of variations may not deviate in one direction.

Figure 3:
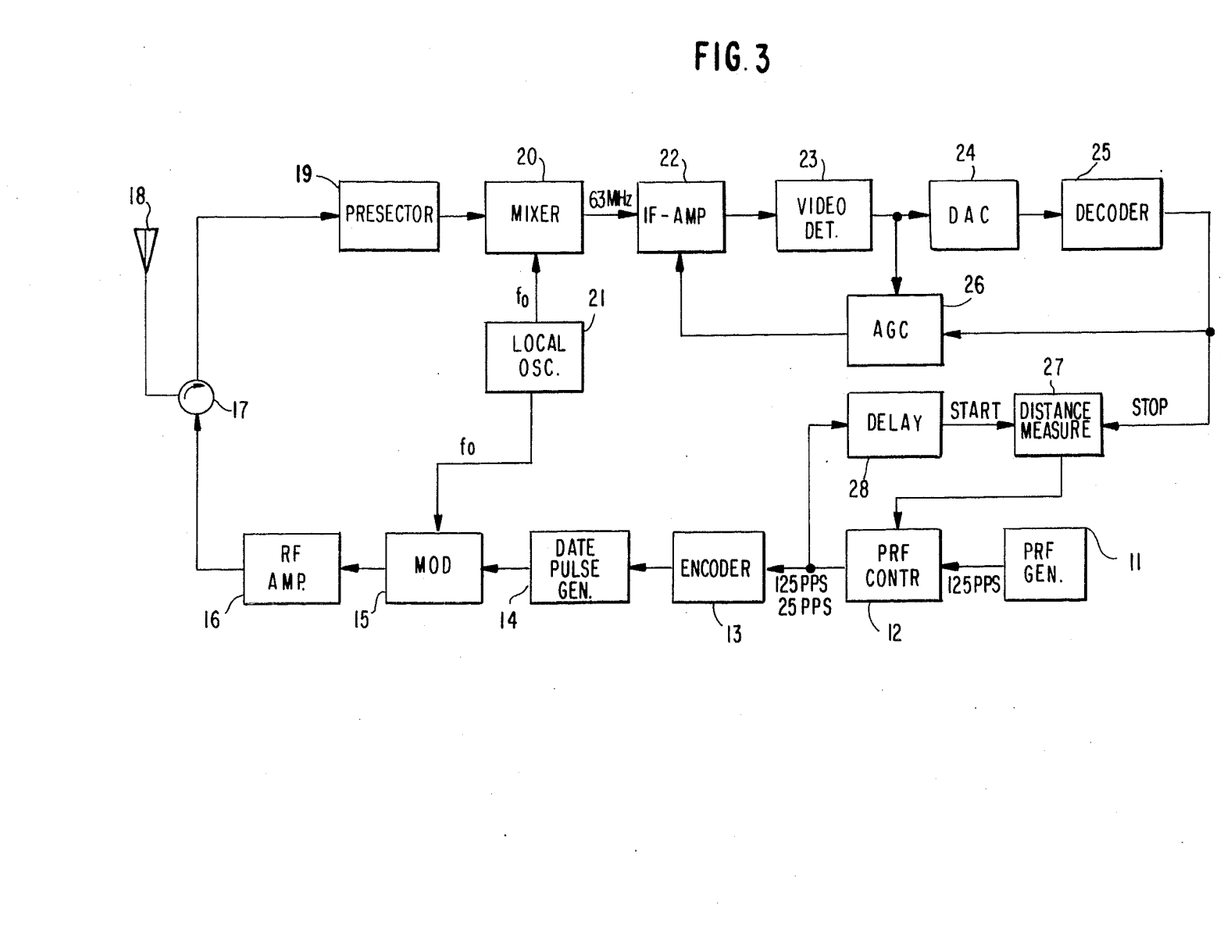
FIG. 3 is a block diagram of an interrogator in distance measuring equipment according to the present invention.

Now description will be presented of a distance measuring system according to one preferred embodiment of the present invention with reference to FIG. 3.

In the case where it is intended to measure the distance between an aircraft and a ground station at an interrogator located on the aircraft, a pulse train having a pulse repetition frequency of, for example, 125 pps is generated from a pulse repetition frequency (PRF) generator 11. This pulse train has its pulse repetition frequency controlled by a PRF control circuit 12 so that it may have different pulse repetition frequencies in a search mode before a reply signal from a transponder is acquired and in a tracking mode after the acquisition. Such search mode and tracking mode can be easily determined by making use of a distance measuring circuit 27 as described in detail, for instance, in U.S. Pat. No. 3,267,464. More particularly, the pulse repetition frequency of the PRF pulse changes from a value of 25 pps in the tracking mode to a value of 125 pps in the search mode in order to achieve faster acquisition of the reply signal during search. The search mode in the distance measurement commences with the transmission of the interrogation signal and terminates with the reception of a reply signal from a ground station. The tracking mode commences when the distance measurement has been completed so that thereafter stable reply pulses are received.

An encoder 13 generates a pair of pulses having a predetermined time interval (for instance 12 $\mu$s) therebetween for each PRF pulse applied thereto. A DATE pulse generator 14 generates a DATE pulse as illustrated in FIG. 1 in response to each one of the pair of pulses. A modulator 15 amplitude-modulates an RF continuous wave (CW) having a frequency fo and fed from a local oscillator 21 with the DATE pulse, thereafter the modulated RF wave is amplified by an RF amplifier 16, and then it is radiated through a circulator 17 and an antenna 18 as an interrogation signal.

Figure 4A:
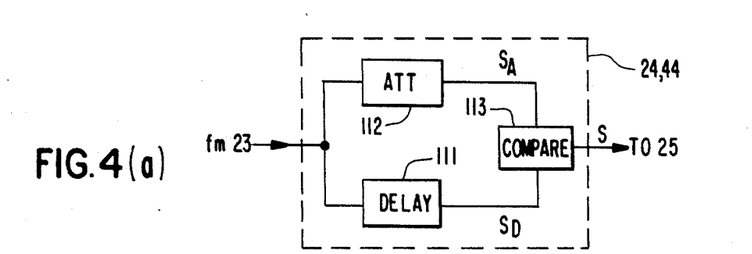
FIG. 4(a) is a block diagram showing circuitry (DAC circuitry) contained in the interrogator illustrated in FIG. 3, FIGS. 4(b) and 4(c) are waveform diagrams showing signals generated by the DAC circuitry.
Figure 4B:
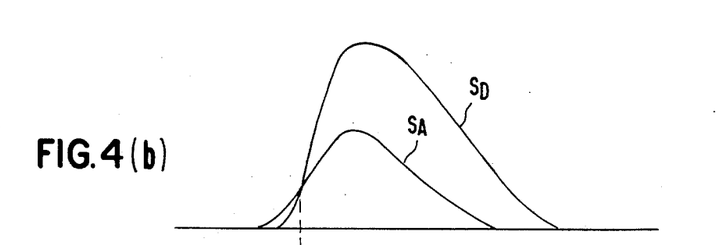
Figure 4C:
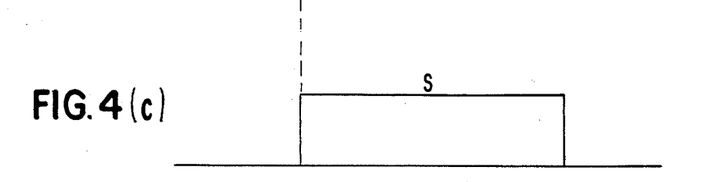

A ground station which has received the interrogation signal and which has the construction shown in FIG. 5, as will be described later, sends back a reply signal. In the airborne interrogator, the reply signal sent back from the ground station is acquired by the antenna 18 and fed to a receiver channel through the circulator 17. The signal entering into the receiving channel has its signal component of a desired frequency selected by a preselector 19 consisting of a band-pass filter, and the selected signal component is applied to a mixer 20. In the mixer 20, the signal component is mixed with a local RF signal having a frequency fo which is fed from the local oscillator 21, and an IF signal of 63 MHz is derived from the mixer 20. This IF signal is amplified up to a predetermined level by an IF amplifier 22, then a video signal is derived from the IF signal in a video detector 23, and the video signal is fed to a Delay and Compare (DAC) circuit 24. The DAC circuit 24, shown in greater detail in FIG. 4(a), consists of delay circuit 111 having a delay time of, for instance, 100 ns, an attenuator 112 having a degree of attenuation of 6 dB and a comparator 113. The DAC circuit generates a timing pulse S (FIG. 4 (c)) which rises at the instant the delayed signal $S_D$ exceeds the attenuated signal $S_A$ (FIG. 4 (b)) and falls at the instant the delayed signal $S_D$ becomes zero or a predetermined level. A decoder 25 outputs a single pulse when it detects a pair of pulses having a predetermined pulse interval (12 $\mu$s) therebetween among the pulses fed from the DAC circuit 24. An AGC circuit 26 responds to the outputs from the decoder 25 and the video detector 23 for controlling the gain of the IF amplifier to thereby maintain the output level of the video detector 23 constant.

A distance measuring circuit 27 is normally formed of a counter as disclosed in the above-referenced U.S. Pat. No. 3,267,464, and it starts counting for measurement of time in response to a pulse applied from the PRF control circuit 12. However, taking into consideration a system delay in the ground station (50 $\mu$s) and a delay time in the transmitter channel and the receiver channel in the interrogator, the output pulse from the PRF control circuit 12 is delayed by a predetermined delay time (for instance, about 60 $\mu$s) in a delay line 28, and the counting in the distance measuring circuit 27 is started by means of the delayed signal. The termination of the counting is effected in response to the output pulse from the decoder 25.

Figure 5:
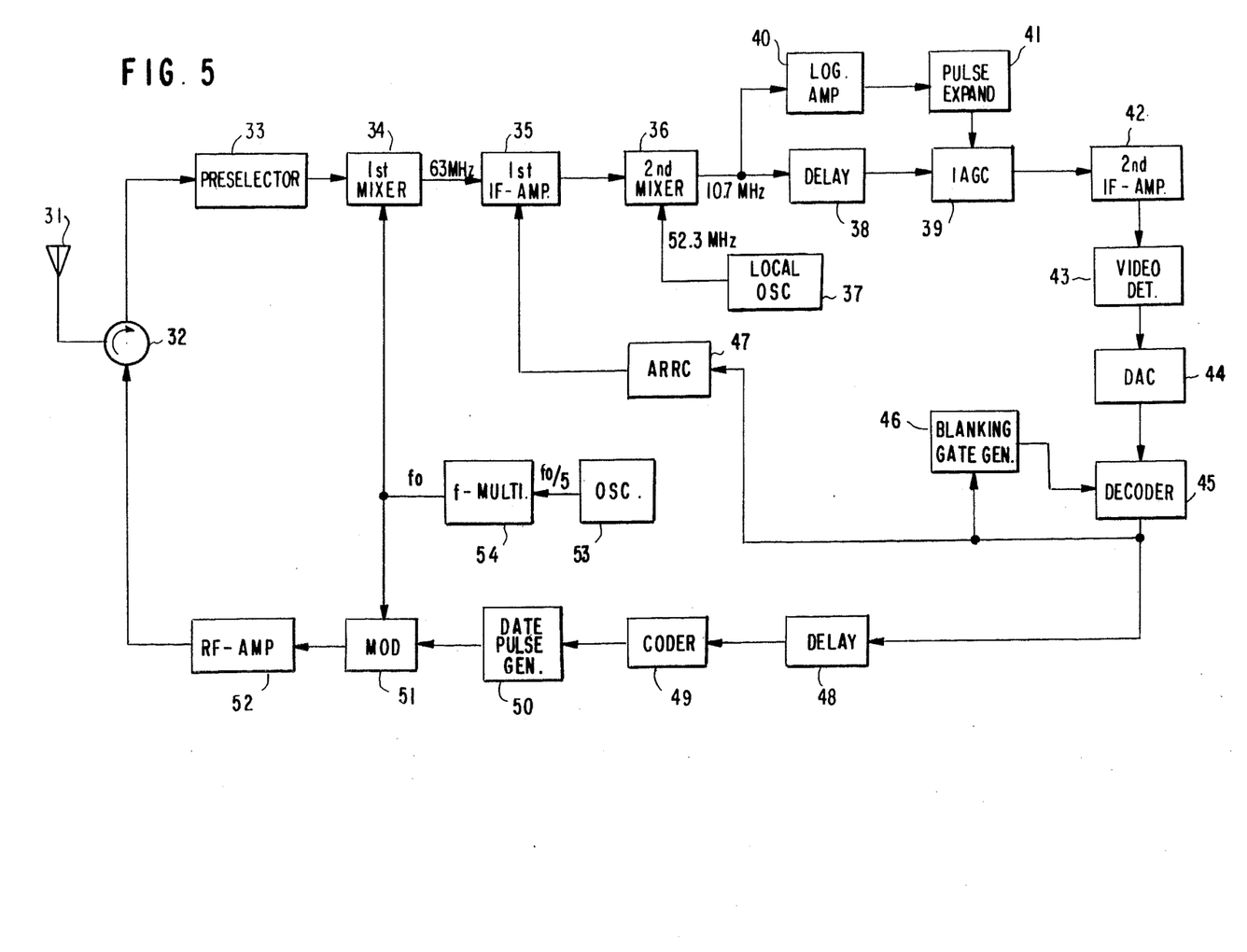
FIG. 5 is a block diagram of transponder in a distance measuring equipment according to the present invention.

A description of the construction and operation of the ground station (transponder) will now be provided with reference to FIG. 5.

The interrogation pulse transmitted from the interrogator is received by an antenna 31 of the ground station (transponder), and after passing through a circulator 32, it is fed through a preselector 33 having a similar construction to the preselector 19 in the interrogator to a first mixer 34. In the mixer 34, the received signal is mixed with a signal having a frequency fo, which is generated by a first local oscillator 53 and a frequency-multiplier 54, and an IF signal having an intermediate frequency of 63 MHz is provided at an output. The IF signal is, after being amplified by a first IF amplifier 35, mixed with a signal having a frequency of 52.3 MHz fed from a second local oscillator 37 in a second mixer 36 to be converted into a signal having a second intermediate frequency of 10.7 MHz, and then the converted signal is fed to a logarithmic amplifier 40 and a delay line 38.

The signal amplified logarithmically in the logarithmic amplifier 40 is applied to a pulse expander 41, in which, each time a pulse having a level higher than a predetermined level is applied thereto, the level information is retained, and a pulse having a somewhat longer time width (for example, 20 μs) than the period when the interrogation pair pulses exist, is generated and input to an Instantaneous Automatic Gain Control (IAGC) circuit 39. In the IAGC circuit 39, level adjustment is effected for a signal delayed by a predetermined time (for instance, 4 μs) in the delay line 38 in accordance with the level of the pulse applied from the pulse expander 41. More particularly, the IAGC circuit 39 consists of a variable attenuator whose degree of attenuation is varied in accordance with the level of the pulse applied from the pulse expander 41, and it effects level adjustment for the input pulse upon each incoming pulse to maintain the output level constant.

The signal maintained at a constant level is, after being amplified by a second IF amplifier 42, detected by a video detector 43, and fed to a DAC circuit 44. The DAC circuit 44 has the circuit construction shown in FIG. 4(a) similar to the DAC circuit 24 in the interrogator, and it detects a pulse position with high precision by making use of the inflection point on the pulse waveform produced according to the present invention as a timing detection point. In a decoder circuit 45, each time an interrogation pair of pulses having a predetermined time interval (for instance, 12 μs) therebetween is detected, and a single pulse is generated.

In the transponder, as is well known, in order to prevent a receiving function and a transmitting function from occurring simultaneously and to eliminate the influences of multipath, a blanking gate signal is generated in a blanking gate generator 46 so as to stop the activity of the decoder 45 for a predetermined period (60 μs) after the above-mentioned pair of pulses have been detected. For the purpose of facilitating AGC at the interrogator, the repetition rate of the output pulses from the decoder 45 is controlled by an Automatic Repetition Rate Control (ARRC) circuit 47 so that is may be always kept within a predetermined range (1000—2700 pulses/sec). More particularly, the ARRC circuit 47 counts the number of output pulses from the decoder 45 in a given time and feeds a control voltage proportional to the number of pulses to the first IF amplifier 35 to adjust a noise level from the amplifier 35.

The output pulses from the decoder 45 are also delayed for a predetermined period (to keep the period from the reception to the transmission at 50 μs) by a delay line 48, and then paired pulses having a predetermined time interval (12 μs) therebetween are derived from the delayed pulses by a coder 49. A DATE pulse generator 50 generates pulse waveforms suitable for a pulse waveform to be transmitted from the transponder (for instance, the DATE pulse shown in FIG. 1) as triggered by the pair pulses. A modulator 51 amplitude-modulates an RF continuous wave (CW) having a frequency fo and fed from the frequency-multiplier 54 with this pulse waveform. The amplitude-modulated signal is, after being amplified by an RF amplifier 52, transmitted as a reply signal towards the interrogator through the circulator 32 and the antenna 31.

Figure 6:
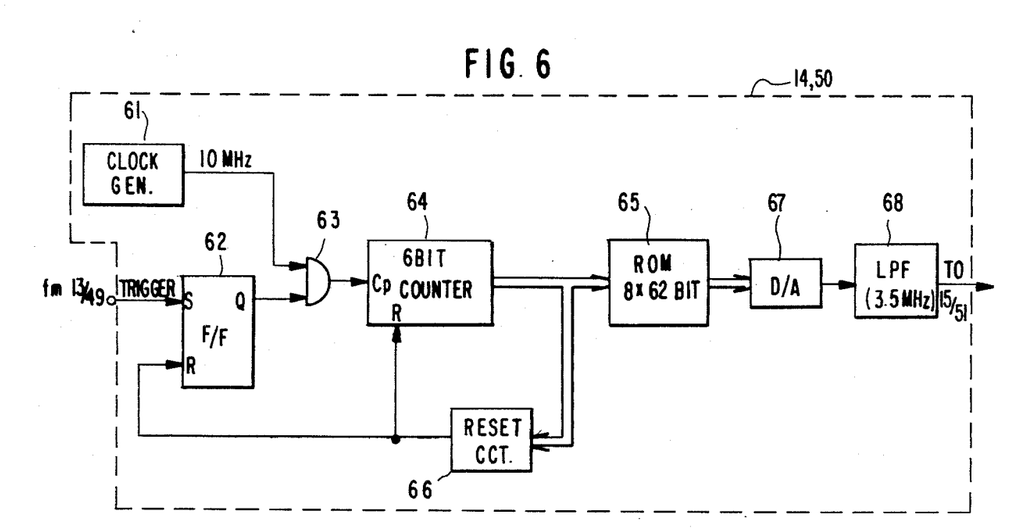
FIG. 6 is a block diagram of a pulse generator for generating a pulse waveform proposed according to the present invention.

The DATE pulse generator 14 or 50 for generating a DATE pulse, represented by the Formula-(1) proposed according to the present invention, is constructed as shown in FIG. 6. Basically it is constructed in such manner that the above-mentioned pulse waveform is sampled at equally divided points on the time axis, address numbers are given to the respective dividing points in the sequence of the lapse of time, the sampled values at the respective dividing points are stored in a memory, and each time a trigger signal is applied from the coder 14 or 49 to the DATE pulse generator 14 or 50, the stored data are read out of the memory in response to a clock signal having a predetermined frequency. Here, description will be presented of one example in which the pulse generated by the pulse generator employs the waveform represented by the Formula-(1) for its rising portion and the $\cos^2$ waveform which is similar to the Gaussian waveform for its subsequent falling portion.

The value of the parameter F for providing a necessary inflection point (timing detection point) is determined from the diagram shown in FIG. 2. Then on the basis of the relation between time T and a voltage V obtained by substituting this F value into the Formula-(1) a waveform normalized by a peak value Vp of the voltage V is derived, as a rising waveform portion. Likewise, for the falling waveform portion, the waveform of $\cos^2\theta$ in the range of $-\pi/2 \leq \theta \leq 0$ is derived in the normalized form by its peak value. Next, for the DATE pulse (the rising portion) a unit on the time axis is determined on the basis of a predetermined rise time, while for the $\cos^2$ waveform (the falling portion) it is determined by a predetermined pulse width, and thereby the time axis units of the respective waveform portions are made to coincide with each other. Thereafter, the respective waveforms are smoothly connected at their peak portions to obtain the waveform shown in FIG. 1. Then the time axis of the obtained waveform is equally divided by a predetermined number, address numbers are given to the respective dividing points in the order of the lapse of time, and the values of the above-mentioned waveform sampled at the respective dividing points are stored at the corresponding addresses in a Read-Only Memory (ROM). In one practical example, when the parameter F is selected to be 0.5 (the position of the point of inflection has a magnitude of 34% of the peak value), a rise time is selected to be 1.3 μs and a pulse width is selected to be 3.5 μs, the DATE pulse waveform takes the form shown in FIG. 7. If the time axis of this pulse waveform is divided into 62 equal parts, then the sampling interval becomes equal to 0.1 μs, and therefore, the frequency of the read clock of the ROM could be selected at 10 MHz. The respective sampled values are represented by 8-bit binary numbers and stored in a ROM having a memory capacity of 8×62 bits.

Figure 7:
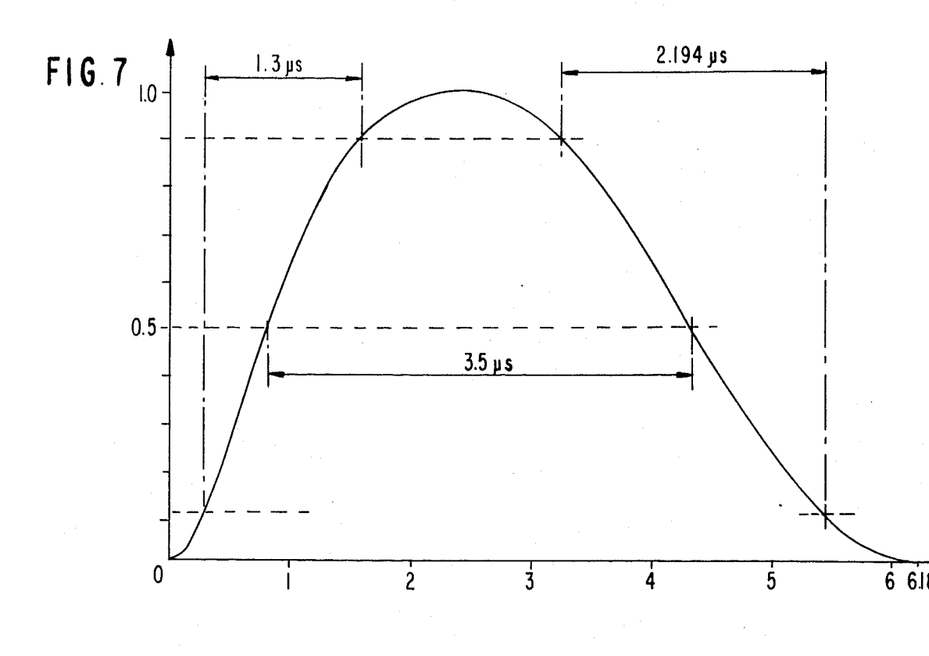
FIG. 7 is a waveform diagram showing on example of a waveform proposed according to the present invention that is derived when the parameter F is selected to be 0.5.

The operation of the circuit shown in FIG. 6 will now be explained. When a trigger signal fed from the encoder 13 in the interrogator or the coder 49 in the transponder is applied to a set input terminal S of a flip-flop 62, a High-level signal from the Q-output of the flip-flop 62 and a clock signal of 10 MHz from a clock generator 61 are applied to an AND circuit 63, so that a 6-bit counter 64 counts the number of clock pulses applied to its CP-terminal during the period when the High-level signal is present, and feeds a 6-bit address signal to the ROM 65. In the ROM 65, level information stored at a memory position corresponding to the address signal is read out and fed to a D/A converter 67. When the count output from the counter 64 has become "62", a reset circuit 66 resets the count value in the counter 64, and also resets the flip-flop 62 to turn the output at its output terminal Q to a Low-level for inhibiting clock signals from being applied to the counter 64. After the digital output from the ROM 65 has been converted into an analog signal by the D/A converter 67, the analog signal is smoothed by a Low-Pass Filter (LPF) 68, and thereby a pulse output as shown in FIG. 7 can be obtained. Since such pulse waveform is produced each time a trigger signal from the encoder 13 or the coder 49 is applied to the DATE pulse generator 14 or 50, paired pulses having a time interval of 12 μs can be easily obtained.

Figure 8:
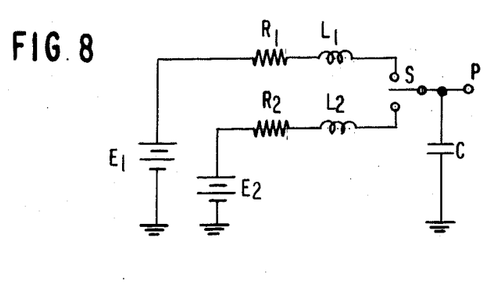
FIG. 8 is an equivalent circuit diagram of a circuit used for generating a pulse waveform proposed according to the present invention.

Alternatively, the above-described DATE pulse can be obtained theoretically by means of a circuit shown in FIG. 8. In this figure, reference symbol C represents a capacitor, symbols $R_1$ and $R_2$ represent resistors, symbols $L_1$ and $L_2$ represent coils, symbols $E_1$ and $E_2$ represent voltage sources, and symbol S represents a transfer switch.

Assuming now the initial condition that the charge on the capacitor C is zero (i.e. a voltage at a point P is zero) and at a time point t=0 the switch S is connected to a contact on the side of the coil $L_1$, then an output voltage $V_R(T)$ at the point P is generally represented by the following formula which is identical to the Formula-(1) above:

$$V_R(T) = E_1\left[1 - \frac{1+\sqrt{1-4F}}{2\sqrt{1-4F}}E_{xp}\left(-\frac{1-\sqrt{1-4F}}{2F}T\right) + \frac{1-\sqrt{1-4F}}{2\sqrt{1-4F}}E_{xp}\left(-\frac{1+\sqrt{1-4F}}{2F}T\right)\right]$$

where T represents time normalized by $CR_1$ (i.e. $T=t/CR_1$) and F is given by $F=L_1/CR_1^2$.

The thus obtained waveform $V_R(T)$ generally would rise at T=0 from the zero-level, and at the time point when the value of $V_R(T)$ assumes the initial peak value determined by the value of the parameter F or a value that is very close to the peak value, the switch S is transferred from the side of the coil $L_1$ to the side of the coil $L_2$. For instance, assuming now that the value of $R_2$ is selected so small that its influence can be neglected, then at the output point P a voltage waveform is produced approximately represented by the formula of:

$$V_R'(t') = \frac{E_2}{2}\left(1 + \cos\frac{t'}{\sqrt{L_2C}}\right) \quad (3)$$

taking the time point when the switch S has been transferred to the side of the coil $L_2$ as a new origin of time $t'=0$ (the time t' used herein being not normalized as is the case with the above-referred time T). Therefore, by appropriately selecting the voltage $E_2$ the falling waveform can be continuously connected to the above-described rising waveform and can be made to softly touch the 0-level line (to have a first order derivative equal to 0 at the point when the waveform takes the 0-level). In this way, by disconnecting the switch S from the contact on the $L_2$ side at the time point when the falling waveform has reached the zero-level, a single-peak pulse waveform can be produced. The falling waveform in this case is not a $\cos^2$ waveform but a waveform represented by the above Formula-(3).

As described above, in the case where the above-described DATE pulse waveform is incorporated at a leading edge of a pulse, various advantages are provided, and this is also supported by numerical calculations. For instance, computer simulation in the case where DATE pulses having a parameter F selected at 0.25 and 0.5, respectively, and a "cos-cos²" pulse have been compared with respect to a degree of attenuation of a spectrum under the conditions of 1.4 μs in rise time and 3.5 μs in pulse width, produces the results indicated in the following table. In this table, fo represents a center frequency of a signal.

| Pulse Waveform | Degree of Attenuation for a Spectrum of 0.5 MHz in Bandwidth (dB) | |
|---|---|---|
| | fo ± 0.8 MHz | fo ± 2 MHz |
| DATE (F = 0.25) | −36.6 | −58.4 |
| DATE (F = 0.5) | −37.5 | −64.3 |
| "cos-cos²" | −36.5 | −53.5 |

With reference to this table also it can be seen that the DATE pulse is excellent in spectrum attenuation characteristics as compared to the "cos-cos²" pulse.

It is to be noted that while the parameter F for the DATE pulse can be set at any arbitrary positive finite value, if the value of the parameter F is selected close to zero, then the inflection point to be used as a timing detection point will shift towards a low level as shown in FIG. 2, and hence it becomes liable to be influenced by noise, resulting in lowering of a detection sensitivity. On the contrary, if the value of the parameter F is selected large, then the inflection point is delayed from the rise point of the waveform and hence it is influenced by multipath, also resulting in a lowering of a detection sensitivity. Therefore, taking into consideration the abovementioned facts, it is desirable to select the value of the parameter F so that the inflection point may come within the range of 5% to 40% of the peak value.

Here it is to be noted that the above-referred international standard (4) with respect to the degree of attenuation of a spectrum for the transponder is more severe than that for the interrogator as described previously.

Figure 9:
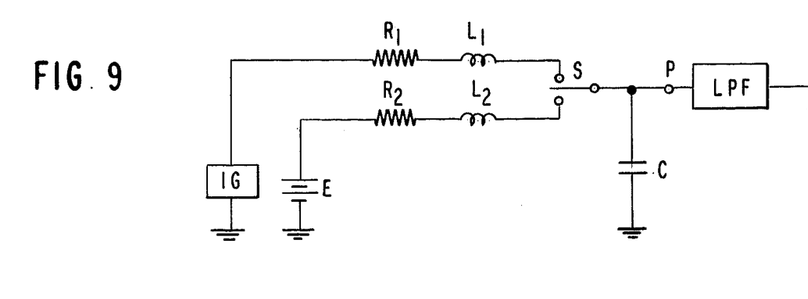
FIG. 9 is an equivalent circuit diagram of a circuit used for generating a pulse waveform proposed according to the present invention as a waveform to be transmitted from a transponder.

Therefore, the present invention also proposes pulse waveforms which can also meet the standards (4) and (5) for the transponder and the interrogator. This waveform is a waveform obtained by passing through a Low-Pass Filter (LPF) a waveform derived from a circuit formed by replacing an Impulse Generator (IG) for the voltage source $E_1$ in the circuit shown in FIG. 8, as shown in FIG. 9. In FIG. 9, reference symbol IG designates an impulse generator and symbol E designates a D.C. voltage source.

Assuming now that at first the switch S is connected to the contact on the side of the coil $L_1$, the charge on the capacitor C is made 0 (that is, an output voltage at point P is made 0) as an initial condition, and at a time point $t=0$ an ideal impulse is generated by the impulse generator IG, then the output voltage $V_R(T)$ at point P is represented generally by the following formula:

$$V_R(T) = \frac{V}{\sqrt{1-4F}} \left[ E_{xp}\left( -\frac{1-\sqrt{1-4F}}{2F} T \right) - E_{xp}\left( -\frac{1+\sqrt{1-4F}}{2F} T \right) \right] \quad (4)$$

where T represents time normalized by $CR_1$ (that is, $T=t/CR_1$), the parameter F fulfils $F=L_1/CR_1^2$, and V is a constant of proportionality. Accordingly, if the switch S is transferred from the side of the coil $L_1$ to the side of the coil $L_2$ at the time point when the output voltage $V_R(T)$ takes a peak value similar to the case of the above-described DATE pulse waveform, then a single-peak pulse waveform can be obtained.

In the case where $F=\frac{1}{4}$ is selected in the above general Formula-(4) (in the so-called critical damping condition), the output voltage becomes a single-peak pulse waveform represented by the following formula:

$$V_R(t) = V_p t/t_p \text{ EXP } (1-t/t_p) \quad (5)$$

where t represents unnormalized time, $t_p$ represents the unnormalized time at the moment when the output voltage $V_R(t)$ takes a peak value, and is given by $t_p=2L/R=1/2CR$, and $V_p$ represents the output voltage at that moment $V_R(tp)$, that is, the peak value of the waveform.

Although a single-peak pulse waveform (hereinafter called "DATE-A pulse") can be produced in the above-described manner, it will be obvious that as a matter of course, the use of the circuit incorporating a ROM as shown in FIG. 6 is preferable. According to the present invention, the reduction of maximum ERP due to the standard is eliminated by using a waveform obtained by passing the derived DATE-A pulse through the Low-Pass Filter (LPF). It is confirmed that DATE-A pulse meets with the standard (5). The pulse obtained through the above-mentioned process is hereinafter called "DATE-G pulse".

Figure 10:
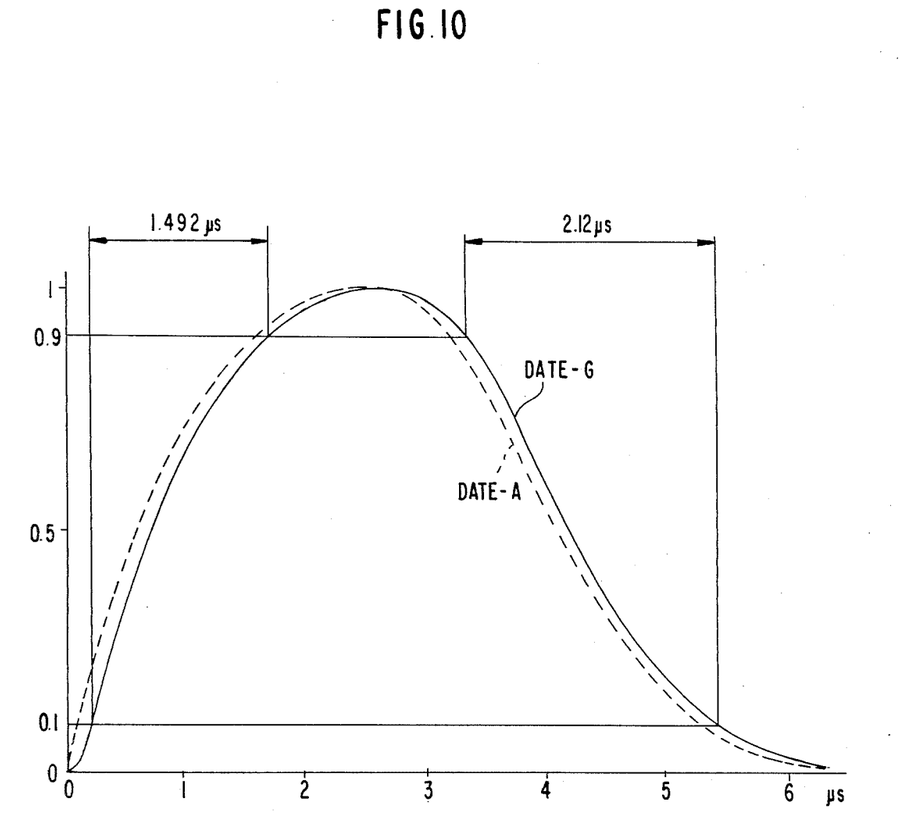
FIG. 10 is a waveform diagram showing waveforms obtained at different positions in the circuit shown in FIG. 9.

In FIG. 10 are shown a DATE-A pulse obtained under the condition of $t_p=2.6$ μs in the case of $F=\frac{1}{4}$ (that is, the waveform represented by the Formula-(5)) by a dotted line, and a DATE-G pulse obtained in the case of employing as the LPF a cascade connection of two stages of Butterworth low-pass filters having a cut-off frequency of 2 MHz by a solid line. As will be apparent from this figure, since the DATE-A pulse waveform is not smooth in the transition from zero in the proximity of the rise point, that is, since the first order derivative of the general Formula-(4) at the time of zero has a finite value, spectrum spread of the DATE-A pulse waveform becomes large. Whereas, in the case of the DATE-G pulse obtained by passing the DATE-A pulse through the LPF, the rising portion is smoothed, and hence spectrum spread is reduced. This is also apparent from the fact that the attenuations of a spectrum power at the 0.8 MHz and 2 MHz offset points obtained by calculating on the basis of the Formula-(4) under the conditions of $F=\frac{1}{4}$ and $t_p=2.6$ μs are 34 dB and 54 dB, respectively, and that these values are well matched with the power ratio of 20 dB between the respective offset points that is required for the transponder as described above. In addition, except for the rising portion, the DATE-G pulse has a waveform derived by somewhat retarding the DATE-A pulse in time, and hence, the steep rise characteristic of the DATE-A pulse can be in itself utilized in the case of the DATE-G pulse.

Accordingly, it is seen that this waveform has the characteristics desired for the transmission waveform from the transponder that within the restriction of the international standard, the slope at the timing detection point according to the DAC circuit should be made as steep as possible and moreover the allowable maximum ERP should be made as large as possible. In this connection, the maximum ERP allowed for the transponder in the case of employing this DATE-G pulse is about 500 watts with regard to the spectrum at both the 0.8 MHz and 2 MHz offset points, whereas that in the case of the "cos-cos$^2$" pulse having the same slope at a point of 10% from the rise point is about 300 watts, and therefore, it is seen that the DATE-G pulse is more advantageous.

In the heretofore known distance measuring systems, since each channel in a DME system is separated by a 1 MHz difference for each channel, a receiver channel having a relatively narrow bandwidth was used in order to eliminate interfering disturbance signals from adjacent channels. However, according to the present invention, an improved construction of the receiver channel can be employed such that a wide-band receiver channel is provided separately in addition to the narrow-band receiver channel, in the case where it is necessary to eliminate interference by the adjacent channels or in the case of such long-distance measurement that detection is impossible with the wide-band receiver channel due to noises, the narrow-band receiver channel is used, whereas in the case where interference by the adjacent channels is little and a high precision is required as in the case of employing the distance measuring system as a landing guidance system, the receiver channel is switched to the wide-band receiver channel to achieve high-precision distance measurement by fully utilizing the characteristic merits possessed by the DATE-G Gaussian waveform having a steep rising portion within the range where a high precision is necessitated.

As described in detail above, according to the present invention there is provided a high-precision distance measuring system which is compatible with the heretofore known equipment, which is less influenced by reflected waves during wave propagation, and which has a balanced margin for the requirements provided by the International Standard. Therefore, the present invention can achieve improvements in performance and reliability of the distance measuring equipment.

We claim:

1. A distance measuring equipment, in which an interrogation pulse is transmitted from an interrogator and a reply pulse is transmitted from a transponder in response to said interrogation pulse, and by measuring the time from the transmission of said interrogation pulse to the reception of said reply pulse on the basis of the timing positions of said interrogation pulse and said reply pulse, the distance between said interrogator and said transponder can be measured, said interrogator comprising:

a pulse generator for generating said interrogation pulse having at least the leading edge approximately expressed by the formula of $$E\left[1 - \frac{1+\sqrt{1-4F}}{2\sqrt{1-4F}} E_{xp}\left(-\frac{1-\sqrt{1-4F}}{2F}T\right) + \frac{1-\sqrt{1-4F}}{2\sqrt{1-4F}} E_{xp}\left(-\frac{1+\sqrt{1-4F}}{2F}T\right)\right]$$

where E and F represent finite positive numbers and T represents time, and means for detecting said timing position of said reply pulse, said timing position being selected in the proximity of an inflection point of said reply pulse, and said transponder comprising:

a pulse generator for generating said reply pulse, and means for detecting said timing position of said interrogation pulse, said timing position being selected in the proximity of an inflection point of said interrogation pulse.

2. A distance measuring equipment, in which an interrogation pulse is transmitted from an interrogator and a reply pulse is transmitted from a transponder in response to said interrogation pulse, and by measuring the time from the transmission of said interrogation pulse to the reception of said reply pulse on the basis of the timing positions of said interrogation pulse and said replay pulse, the distance between said interrogator and said transponder can be measured, said interrogator comprising:

a pulse generator for generating said interrogation pulse having at least the leading edge approximately expressed by the formula of $$E\left[1 - \frac{1+\sqrt{1-4F}}{2\sqrt{1-4F}} E_{xp}\left(-\frac{1-\sqrt{1-4F}}{2F}T\right) + \frac{1-\sqrt{1-4F}}{2\sqrt{1-4F}} E_{xp}\left(-\frac{1+\sqrt{1-4F}}{2F}T\right)\right]$$

where E and F represent finite positive numbers and T represents time, and means for detecting said timing position of said reply pulse, said timing position being selected in the proximity of a predetermined rising portion of said reply pulse;

and said transponder comprising:

a pulse generator for generating said reply pulse obtained by passing a pulse approximately expressed by the formula of $$\frac{E}{\sqrt{1-4F}}\left[E_{xp}\left(-\frac{1-\sqrt{1-4F}}{2F}T\right) - E_{xp}\left(-\frac{1+\sqrt{1+4F}}{2F}T\right)\right]$$

through a low-pass filter having a predetermined cut-off frequency and means for detecting said timing position of said interrogation pulse, said timing position being selected in the proximity of an inflection point of said interrogation pulse.

3. A distance measuring equipment as claimed in claim 2, wherein said pulse generator in the interrogator comprises means for generating said interrogation pulse in which the value of F is selected to be $F \approx 0.083$ and said pulse generator in the transponder generates said reply pulse in which the value of F is selected to be $F \approx 0.25$.

4. A distance measuring equipment as claimed in claim 2, wherein said pulse generator consists of:

a memory which stores digital level informations obtained by sampling a predetermined waveform with a predetermined frequency; and a D/A converter for converting a signal read out of said memory in response to a clock signal of a predetermined frequency into an analog signal, wherein said low-pass filter filters the output of said D/A converter.

5. A distance measuring equipment for use in a system in which an interrogation pulse is transmitted from said equipment and a reply pulse is transmitted from transponder in response to said interrogation pulse received, and by measuring the time from the transmission of said interrogation pulse to the reception of said reply pulse on the basis of the timing positions of said interrogation pulse and said reply pulse, the distance between said equipment and said transponder is measured, said equipment comprising:

a pulse generator for generating said interrogation pulse having at least the leading edge approximately expressed by the formula of $$E\left[1 - \frac{1+\sqrt{1-4F}}{2\sqrt{1-4F}} E_{xp}\left(-\frac{1-\sqrt{-4F}}{2F}T\right) + \frac{1-\sqrt{-4F}}{2\sqrt{1-4F}} E_{xp}\left(-\frac{1+\sqrt{1-4F}}{2F}T\right)\right]$$

where E and F represent finite positive numbers and T represents time; and means for detecting said timing position of said reply pulse received.

6. A distance measuring equipment for use in a system in which an interrogation pulse is transmitted from an interrogator and a reply pulse is transmitted from said equipment in response to said interrogation pulse, and by measuring the time from the transmission of said interrogation pulse to the reception of said reply pulse on the basis of the timing positions of said interrogation pulse and said reply pulse, the distance between said interrogator and said transponder is measured, said equipment comprising:

a pulse generator for generating said reply pulse having at least the leading edge approximately expressed by the formula of $$E\left[1 - \frac{1+\sqrt{1-4F}}{2\sqrt{1-4F}} E_{xp}\left(-\frac{1-\sqrt{1-4F}}{2F} T\right) + \frac{1-\sqrt{1-4F}}{2\sqrt{1-4F}} E_{xp}\left(-\frac{1+\sqrt{1-4F}}{2F} T\right)\right]$$

where E and F represent finite positive number and T represents time, and means for detecting said timing position of said interrogation pulse.

7. A distance measuring equipment as claimed in claim 1, 5 or 6, wherein said pulse generator comprises means for generating said interrogation pulse in which the value of F is selected to be $F \approx 0.083$.

8. A distance measuring equipment as claimed in claim 1, 5 or 6, wherein said pulse generator comprises means for generating said interrogation pulse in which the value of F is selected to be $F \approx 0.5$.

9. A distance measuring equipment as claimed in claim 1, 5 or 6, wherein said pulse generator consists of a memory which stores digital level informations obtained by sampling a predetermined waveform with a predetermined frequency, a D/A converter for converting a signal read out of said memory in response to a clock signal of a predetermined frequency into an analog signal, and a low-pass filter for filtering the output of said D/A converter.

10. A distance measuring equipment as claimed in claim 1, 5 or 6, wherein said pulse generator comprises means for generating said interrogation pulse in which an inflection point of the leading edge lies within 5% to 40% of the peak value of said interrogation pulse.

11. A distance measuring equipment for use in a system in which an interrogation pulse is transmitted from an interrogator and a reply pulse is transmitted from said equipment in response to said interrogation pulse received, and by measuring the time from the transmission of said interrogation pulse to the reception of said reply pulse on the basis of the timing positions of said interrogation pulse and said reply pulse, the distance between said interrogator and said transponder is measured, said equipment comprising:

a pulse generator for generating a pulse approximately expressed by the formula of $$\frac{E}{\sqrt{1-4F}}\left[E_{xp}\left(-\frac{1-\sqrt{1-4F}}{2F} T\right) - E_{xp}\left(-\frac{1+\sqrt{1+4F}}{2F} T\right)\right],$$

means coupled to said pulse generator for obtaining said reply pulse by passing the output pulse of said pulse generator through a low-pass filter having a predetermined cut-off frequency, and means for detecting said timing position of said interrogation pulse received.

12. A distance measuring equipment as claimed in claim 11, wherein said pulse generator comprises means for generating said pulse in which the value of F is selected to be $F \approx 0.25$.

13. A distance measuring equipment as claimed in claim 1, 2, 5, 6 or 11, wherein said means for detecting said timing position consists of an attenuator for attenuating an input signal by a predetermined amount, a delay circuit for delaying said input signal by a predetermined time, and a comparator for generating a pulse which rises when the output of said delay circuit becomes larger than the output of said attenuator.

* * * * *

UNITED STATES PATENT AND TRADEMARK OFFICE
CERTIFICATE OF CORRECTION

PATENT NO. : 4,455,556
DATED : June 19, 1984
INVENTOR(S) : Koshio et al.

It is certified that error appears in the above-identified patent and that said Letters Patent is hereby corrected as shown below:

```
Column  1, line 16, after "an", delete "(".
Column  2, line 24, after "at", replace "the" with --that--;
           line 55, replace "whent" with --when--.
Column  3, line 37, delete "con-";
           line 38, delete "form value".
Column  4, line 13, delete "equipped";
           line 43, before "both", insert --for--.
Column  5, line 49, after "of", insert --a--;
           line 49, after "in", delete "a";
           line 55, replace "on" with --one--.
Column  6, line 65, after "the" (2nd occurrence) delete "0%";
           line 66, after "the", insert --0%--.
Column  9, line 49, before "a", delete "and".
```

UNITED STATES PATENT AND TRADEMARK OFFICE
CERTIFICATE OF CORRECTION

PATENT NO. : 4,455,556

DATED : June 19, 1984

INVENTOR(S) : Koshio et al.

It is certified that error appears in the above-identified patent and that said Letters Patent is hereby corrected as shown below:

Column 11, line 26, after "such", insert --a--.

Column 12, line 28, insert --a-- before "computer".

Column 16, line 11, insert --,-- after "frequency".

Signed and Sealed this

Second Day of April 1985

[SEAL]

Attest:

DONALD J. QUIGG

Attesting Officer  Acting Commissioner of Patents and Trademarks